United States Patent
Åström

(10) Patent No.: US 8,752,107 B2
(45) Date of Patent: Jun. 10, 2014

(54) TIME-SHIFTING AND CHASE-PLAY FOR AN IPTV SYSTEM

(75) Inventor: Bo Åström, Stockholm (SE)

(73) Assignee: Telefonaktiebolaget L M Ericcson (Publ), Stockholm (SE)

(*) Notice: Subject to any disclaimer, the term of this patent is extended or adjusted under 35 U.S.C. 154(b) by 404 days.

(21) Appl. No.: 12/281,723

(22) PCT Filed: Mar. 7, 2006

(86) PCT No.: PCT/EP2006/060530
§ 371 (c)(1),
(2), (4) Date: Jan. 14, 2009

(87) PCT Pub. No.: WO2007/101473
PCT Pub. Date: Sep. 13, 2007

(65) Prior Publication Data
US 2009/0217337 A1  Aug. 27, 2009

(51) Int. Cl.
H04N 7/173 (2011.01)
(52) U.S. Cl.
USPC .............................. 725/106; 725/88; 725/115
(58) Field of Classification Search
USPC ........................................... 725/88, 115, 106
See application file for complete search history.

(56) References Cited

U.S. PATENT DOCUMENTS

| 6,882,709 B1* | 4/2005 | Sherlock et al. | 379/90.01 |
| 2005/0091690 A1* | 4/2005 | Delpuch et al. | 725/88 |
| 2005/0183120 A1* | 8/2005 | Jain et al. | 725/46 |
| 2006/0041688 A1 | 2/2006 | Wright et al. | |
| 2007/0101377 A1* | 5/2007 | Six et al. | 725/86 |
| 2009/0235299 A1 | 9/2009 | Astrom et al. | |

FOREIGN PATENT DOCUMENTS

WO   WO 2007/127741   * 11/2007 ............. H04N 7/173

OTHER PUBLICATIONS

T. Magedanz, et al: "The IMS playground @ Fokus—an Open Testebed for Next Generation Network Multimedia Services" Testbeds and research infrastructures for the development of networks and communities, 2005. Tridentcom 2004. First international conference on Trento, Italy Feb. 23-25, 2005. pp. 2-11, XP010774253 ISBN: 0-7695-2219-X The whole document.

Feng Liu et al: "An approach of integrating sip in converge multimodal/multimedia communication services" Computer Communications and Networks, 2003. ICCCN 2003. Proceedings, The 12$^{th}$ International Conference on Dallas, TX USA Oct. 20-22, 2003, Piscataway, NJ USA, IEEE, Oct. 20, 2003, pp. 137-142, XP010695709 ISBN: 0-7803-7945-4 Section 2.1 Multimedia Technology Integration Platform Section 2.2 Integrating SIP with MTIP.

(Continued)

*Primary Examiner* — Nasser Goodarzi
*Assistant Examiner* — Hyun Hong

(57) ABSTRACT

A system and method for time-shifting and chase-play for an IPTV system. A control channel is established between an originating user's set top box (STB) and an IPTV Application Server (IPTV-AS) utilizing SIP signaling over an IP Multimedia Subsystem. For time-shifting, the STB sends a start time-shifting command to the IPTV-AS over the control channel, and the IPTV-AS sends a start recording command to a Network Private Video Recorder (N-PVR). When the user is ready to resume viewing, the STB sends a start chase-play command to the IPTV-AS to establish a unicast channel. The IPTV-AS sends a playback command to the N-PVR to begin playback of the time-shifted content.

9 Claims, 6 Drawing Sheets

(56) References Cited

OTHER PUBLICATIONS

Franz R Ed—Institute of Electrical and Electronics Engineers: "Control architecture for voice/data convergence" ICC 2001. 2001 IEEE International Conference on Communications. Conference Record. Helsinky, Finland, Jun. 11-14, 2001, IEEE International Conference on Communications, New York, NY: IEEE, US, vol. 1 of 10 Jun. 11, 2001, pp. 758-762, XPO10553104 ISBN: 0-7803-7097.1 The whole document.

J-F Rey et al: "SIP Technology in the Enterprise: SIP technology will be the next step in IP telephony services to enterprise users" Alcatel Telecommunications Review, Alactel, Paris Cedex, FR, Oct. 2002, XP007005899 ISSN: 1267-7167 The whole document.

Liao, et al. The Split and Merge (SAM) Protocol for Interactive Video-on-Demand Systems. INFOCOM '97. Sixteenth Annual Joint Conference of the IEEE Computer and Communications Societies. Apr. 7-11, 1997.

* cited by examiner

TIME-SHIFTING AND CHASE-PLAY FOR AN IPTV SYSTEM

FIELD OF THE INVENTION

The present invention relates to time-shifting and chase-play for an IPTV system.

Reference is also made to the Applicant's copending PCT Application No. PCT/EP2006/060279, the contents of which are incorporated herein by reference.

BACKGROUND TO THE INVENTION

IP Multimedia services provide a dynamic combination of voice, video, messaging, data, etc. within the same session. By increasing the number of basic applications and the media that it is possible to combine, it is possible to increase the number of services offered to the end users, and thus to enrich the inter-personal communication experience. This will lead to a new generation of personalised, rich multimedia communication services, including so-called "combinational IP Multimedia" services that are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling is used to describe and negotiate the media components of the session. Whilst SIP was created as a user-to-user protocol, IMS allows operators and service providers to control user access to services and to charge users accordingly.

The boundaries between the services provided by telecommunication operators, TV operators, and internet service providers are disappearing, and such companies are all offering customers all three services (so called "triple play"). For telecommunication operators wishing to offer TV services, a popular choice is to utilize so called IPTV which delivers the TV service over IP and the customer's broadband connection (e.g. ADSL, VDSL, Public Ethernet, etc.).

IPTV has a limited bandwidth at its disposal in the "first mile" of the broadband access from the xDSL modem and the broadband access (DSLAM). Linear content delivery, in which all channels in a subscription ("program package") are simultaneously delivered to the set top box (STB), is not suitable for IPTV due to the limited bandwidth. xDSL connection capacity varies depending on the DSL version used and the distance of the "first mile". ADSL can provide a capacity between 3 to 8 Mbps, whereas ADSL2 promises to deliver up to 25 Mbps downstream and VSDL data rates greater than 30 Mbps. Standard quality MPEG2 content requires 2 Mbps per channel, and HDTV will require 8-10 Mbps per channel. Luckily, the new MPEG4 standard will decrease the required bandwidth to half with the same quality as the MPEG2 coded content. Nevertheless, the available bandwidth is a scarce resource, and IPTV solutions must limit the number of channels to be delivered over the "first mile".

Existing time-shift/chase-play solutions are either based on proprietary network technology or on use of a Private Video Recorder (PVR) in the home. The solution described herein, utilizes the standardized IMS communication system and its network architecture, and a PVR residing in the Network to limit the traffic transmitted over the first mile connection to a home.

SUMMARY OF THE INVENTION

It is an object of the present invention to provide a time-shift/chase-play solution based on a Network Private Video Recorder (N-PVR).

According to a first aspect of the present invention there is provided a method of time-shifting and chase-play for an IPTV system, the method comprising:
  establishing a control channel between the originating user and a selected IPTV Application Server (IPTV-AS);
  sending a start time-shift command to the IPTV-AS over the control channel;
  sending a start recording command from the IPTV-AS to a Network PVR system to initiate recording of current multicast content;
  when the user is ready to resume viewing of the time-shifted content, sending a start chase-play command to the IPTV-AS over the control channel to establish a unicast channel for playback of the time-shifted content; and
  sending a playback command from the IPTV-AS to the Network PVR system to initiate playback of the time-shifted content over the unicast channel.

The invention addresses the issue of time-shifting and chase-play by the use of a Network PVR (N-PVR). An N-PVR makes a lot of sense in IPTV solutions. A PVR in the home requires content to be delivered over the first mile, whereas an N-PVR does not. Content is recorded in the network and will thus not burden the first mile if a user wishes to watch one channel whilst recording another simultaneously.

A user may choose to initiate the time-shift function of IPTV content delivery by means of a set top box (STB) for a number of reasons, such as an event taking place in the home requiring the user's full attention, such as the ringing of a door-bell, the arrival of an ordered pizza, or the imminent start of booked laundry time; the occurrence of incoming communication services, such as telephony, video-telephony, messaging or chat; and notification of a user-subscribed-to event, such as notification of lottery results, notification of hockey/football results, or the imminent start of an ordered pay-per-view movie The solution uses capabilities in IMS to establish a unicast delivery channel of recorded content when a user decides to watch the time-shifted content and initiates chase-play, and allows the IPTV service to integrate with other IMS based services. Examples of other IMS based services are telephony, video-telephony, messaging, chat and push-to-talk.

The solution includes a mechanism for switching from multicast/broadcast delivered content to unicast delivered content. Such switching typically takes place when a user decides to start the time-shifting of multicast delivered content, with the object of resuming delivery of the content at a later time utilising chase-play over a unicast channel.

Some of the advantages obtained by use preferred embodiments of the present invention include:
(i) The possibility of blending the IPTV Service, IMS Communication Services and Personalized Information Services.

(ii) Limitation of the amount of content transmitted over the first mile of a broadband connection (the first mile being a limited resource where many service fight for available capacity).
(iii) Intelligent delivery of TV content allowing other services to utilize available bandwidth.
(iv) An IMS based method for switching between multicast and unicast delivery of content.
(v) An IPTV-AS acting as a gateway between a Network PVR system and STBs. This enables STB-IPTV-AS specific user interaction while allowing operators to use many types of N-PVR system. The adjustment to N-PVR required procedures and protocols is handled by the IPTV-AS.
(vi) The network taking an active role in the IPTV delivery and allowing operators to offer personalized Triple-Play service offerings.

According to a further aspect of the present invention, there is provided a time-shifting and chase-play IPTV system, comprising:
    channel control means for establishing a control channel between the originating user and a selected IPTV Application Server (AS);
    start time-shift means for sending a start time-shift command to the IPTV-AS over the control channel;
    start recording means for sending a start recording command from the IPTV-AS to a Network PVR system to initiate recording of current multicast content;
    start chase-play means for sending a start chase-play command to the IPTV-AS over the control channel when the user is ready to resume viewing of the time-shifted content, to establish a unicast channel for playback of the time-shifted content; and
    playback means for sending a playback command from the IPTV-AS to the Network PVR system to initiate playback of the time-shifted content over the unicast channel.

According to a further aspect of the present invention, there is provided computer program code for carrying out the method of the first aspect of the invention.

BRIEF DESCRIPTION OF THE DRAWINGS

In order that the invention may be more fully understood, a preferred embodiment in accordance with the invention will now be described, by way of example, with reference to the accompanying drawings, in which.

DETAILED DESCRIPTION OF PREFERRED EMBODIMENT

Figure 1:
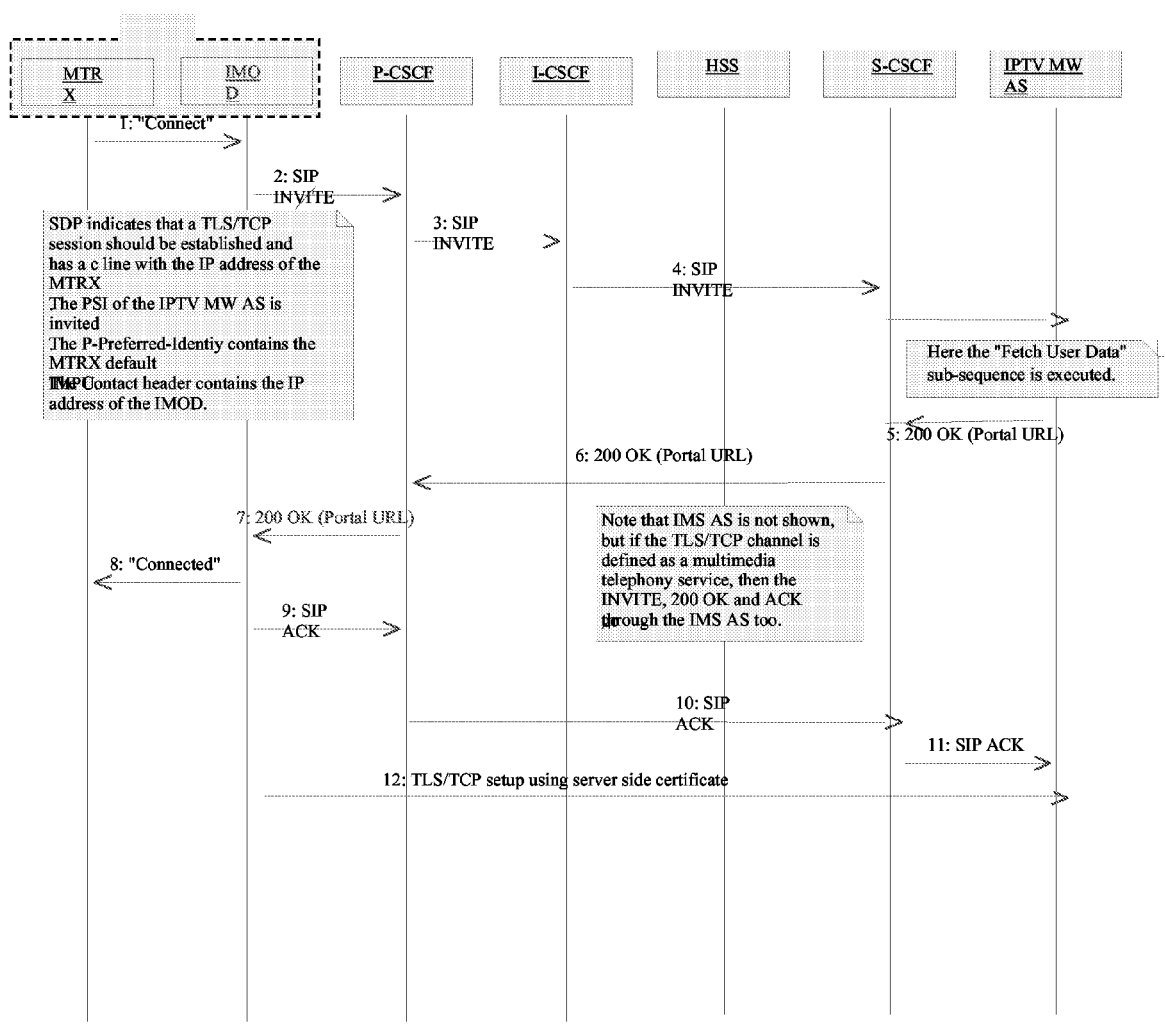
FIG. 1 is a schematic diagram illustrating the establishment of a control channel using a secure TCP/TLS connection.

By way of background to the preferred embodiment, the following is a brief description of how the IP Multimedia Subsystem (IMS) fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique Uniform Resource Identifier (URI) from the S-CSCF to be used when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions that would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). (For the terminating call the request will include the P-CSCF address and the User Equipment (UE) address.)

Within the IMS service network, Application Servers (ASs) are provided for implementing IMS service functionality. ASs provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which ASs should be "linked in" during a SIP Session establishment. Different IFCs may be applied to different call cases. The IFCs are received by the S-CSCF from an HSS during the IMS registration procedure as part of a user's User Profile (UP). Certain ASs will perform actions dependent upon subscriber identities (either the called or calling subscriber, whichever is "owned" by the network controlling the AS). For example, in the case of call forwarding, the appropriate (terminating) application server will determine the new terminating party to which a call to a given subscriber will be forwarded.

The preferred embodiment to be described below relates to an IMS-enabled control channel for an IPTV set top box (STB). The control channel is set up using standard IMS procedures and is later used to send control messages to the IPTV applications server, as well as to deliver personalized content, such as advertisements, voting responses, personalized voting triggers and targeted interactive events.

IMOD Connection to IPTV AS

It should be noted that the STB is described as a single unit in the following. The sequences of the figures show division of the STB into an IMOD and a MTRX but the interaction between these is not described as this is not directly relevant to the inventive concepts described.

When the STB starts, it first registers on the IMS network using the IMS Private ID (IMPI—the private address of the STB) of the Identity and IMS Module (IMOD) in the authorization header, and the default 'family STB' public address in the "From" and "To" headers (as in the normal SIP REGISTER message). Both IMPUs representing the Media Transmitter/Receivers (MTRXs) and IMPUs representing users may register. For personalisation of services, a "User Connection to IPTV MW AS" use routine is executed.

Once the STB is registered, it establishes a secure TCP/TLS connection with the IPTV AS, using a SIP INVITE message. The procedure, as schematically indicated in FIG. 1, is as follows (with reference to the numbers used in the figure):

1. The MTRX (the media end point of the STB) indicates to the IMOD (the Authentication/ISIM carrier part of the STB) that a connection to the IPTV MW AS should be established. The differentiation between the IMOD and the MTRX is optional, and can be seen as an STB internal realization. An STB not having this differentiation would behave identically in relation to the IMS network.

2. The IMOD sends a SIP INVITE message to the P-CSCF. The Public Service Identity of the IPTV MW AS is used to address the IPTV MW AS and may be pre-configured in the ISIM or configured by device management procedures. An SDP description of a TLS/TCP session is included. An alternative procedure would be to use an application framing protocol over the pure TCP/TLS channel, such as MSRP. In this case the SDP description contains MSRP/TLS/TCP instead of only TLS/TCP.

3. The SIP INVITE message is forwarded to the I-CSCF. 3GPP 23.228 describes alternative PSI routing on the terminating side, namely:

a. The I-CSCF interrogates I HSS where the HSS treats every PSI as a "user" and returns routing instructions to the endpoint representing the PSI.

b. I-CSCF interrogation to the HSS where the HSS returns the user allocated S-CSCF. The S-CSCF routes the PSI addressed Invite according to IFC information stored per "PSI-subscriber". The "PSI-subscriber" is assigned an S-CSCF.

c. Sub-domain routing in the I-CSCF where the I-CSCF uses DNS to resolve the PSI into an IP-address for the end-point representing the PSI.

This solution requires Alternative b.

4. The I-CSCF uses DNS to translate the Public Service Identity to the IP address of the actual server that will handle this user this time (load sharing can be applied here). The S-CSCF then sends the SIP INVITE message to the chosen IPTV MW AS. The IPTV MW AS then executes the "Fetch User Data" sub-sequence.

5. The IPTV MW AS returns a 200 OK response. The URL of the user's TV service portal is included in the SDP, as, for example, an XML body that is interpreted in the STB but not in the intermediate nodes.

6. The S-CSCF forwards the 200 OK response.

7. The P-CSCF forwards the 200 OK response.

8. The IMOD receives the URL of the default user's TV service portal (i.e. the portal associated with the IMPU of the MTRX), and it is included in the SDP. This information may be included as an XML body in the 200 OK message, but other means are also possible.

9. The IMOD sends a SIP ACK response.

10. The P-CSCF forwards the SIP ACK response.

11. The S-CSCF forwards the SIP ACK response.

12. The IMOD sets up a TLS/TCP connection to the IPTV MW AS using a server side certificate.

This procedure can also be expanded to add distribution of keys for service protection (a.k.a. conditional access) if the service protection in the system is based on ciphering the content streams. This would involve additional steps after the last step above in which, for example, the keys could be fetched via HTTP. If the different users have different channel bundles, then that type of step would also be needed after the "User Connection, Local User" procedure.

This procedure could also be run only on an "as needed" basis (i.e. the connection would not be automatically set up at registration, but only when access to the IPTV MW AS is required), but the preferred alternative is that the connection is established immediately after the STB/MS registers. This is so that the delay in setting up this connection can be avoided at a time when interaction with the IPTV MW AS is required.

A new control channel is established for each MTRX that is to be connected to the IMOD, as described in the "IMS IPTV Architecture Study" ("Rechon Architecture", EAB-05: 045608, Rev A, Dec. 22, 2005).

The described control channel enables a plethora of functionalities, like remote control on the IPTB STB, as described in "IMS IPTV Architecture Study", EAB-06:001721, Rev A, Feb. 8, 2006, or the user cases described in next section.

When the STB starts, it first registers on the IMS network using the IMS Private ID (IMPI—the private address of the STB) of the Identity and IMS Module (IMOD) in the authorization header, and the default 'family STB' public address in the "From" and "To" headers (as in the normal SIP REGISTER message). Once the STB has been registered, it establishes a secure TCP/TLS connection with the IPTV AS using a SIP INVITE message.

STB Initiated Time-Shift

Figure 2:
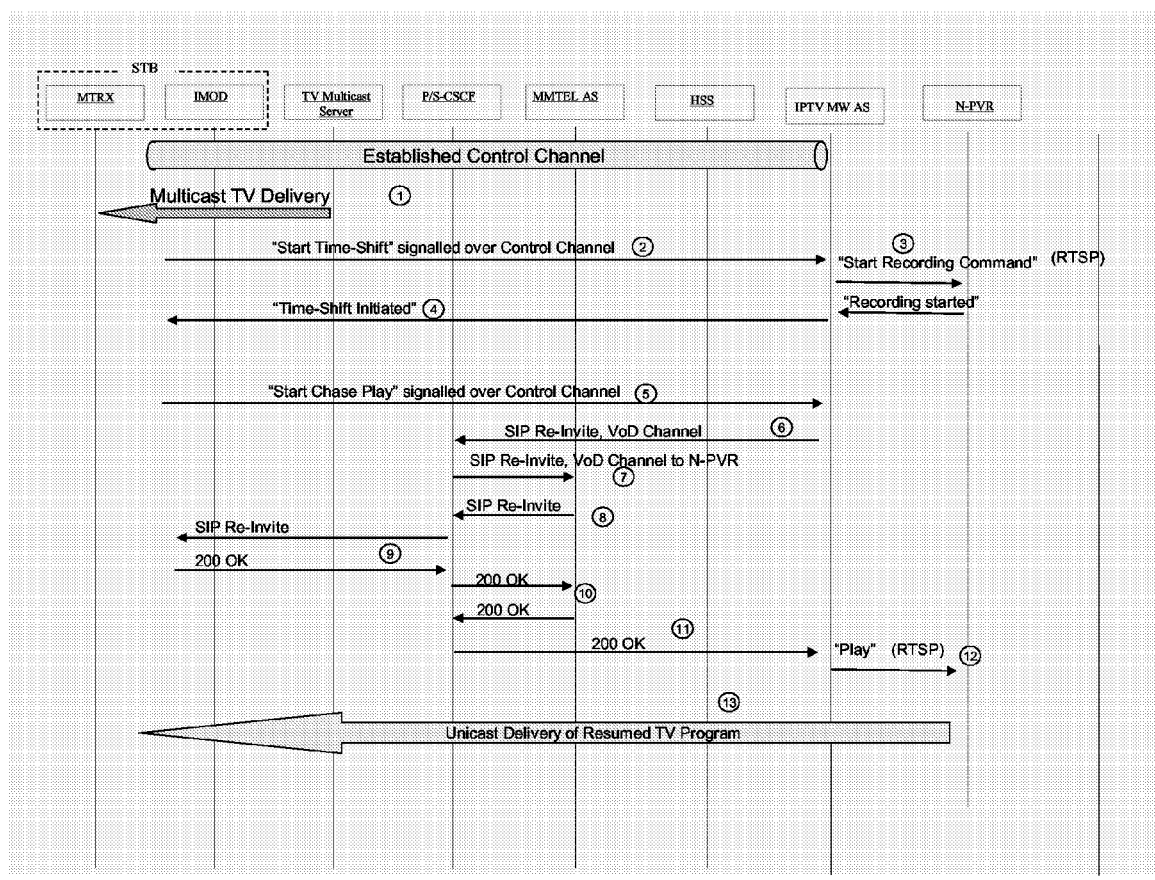
FIG. 2 is a schematic diagram illustrating a sequence for switching between multicast and unicast delivery of content.

In the event that the user requires time shifting of the content to begin, the following IMS based method for switching between multicast and unicast delivery of content can be initiated by the STB. The procedure, as schematically indicated in FIG. 2, is as follows (with reference to the numbers used in the figure):

1) A control channel is established between the STB and the IPTV-AS by the procedure described above with reference to FIG. 1. At this point the STB is receiving content that is delivered by multicast.

2) The user decides to start the Time-Shift function due to an event taking place in the home requiring the user's full attention, such as the ringing of a door-bell, the arrival of an ordered pizza, or the imminent start of booked laundry time, etc. The STB generates a "Start Time-Shift" command and sends this over the control channel to the IPTV-AS. The exact procedure and syntax of the command is a matter between the STB and the IPTV-AS, and many different variants are possible. The IPTV-AS interprets the command before taking the appropriate action.

3) The IPTV-AS initiates recording of the currently viewed multicast channel. This is possible as the STB always reports which multicast channel it is currently receiving after a channel change has occurred (not shown in the figure). A "Start Recording" command is sent from the IPTV-AS to the N-PVR system. The exact procedure and syntax of the command is a matter between the STB and the IPTV-AS, and many different variants are possible. The IPTV-AS acts as a gateway between the N-PVR system and the STB. This enables STB/IPTV-AS specific user interaction whilst allowing use by operators of many different types of N-PVR system. The adjustment of the required N-PVR procedures and protocols is handled by the IPTV-AS.

4) An indication that the Time-Shift has started is returned to the STB and optionally displayed to the user. The multicast channel may or may not continue to be delivered to the STB after the Time-Shift has started. This is a deployment option.

5) When the user is ready to resume viewing of the time-shifted content, he initiates the Chase Play function and a "Start Chase Play" command is sent from the STB to the IPTV-AS over the control channel. The exact procedure and syntax of the command is a matter between the STB and the IPTV-AS, and many different variants are possible. The IPTV-AS acts as a gateway between the N-PVR system and the STB. This enables STB/IPTV-AS specific user interaction whilst allowing use by operators of many different types of N-PVR system. The adjustment of the required N-PVR procedures and protocols is handled by the IPTV-AS. RTSP is used in the sequence by way of example but the invention is not limited to the use of RTSP.

6) The IPTV-AS sends a SIP INVITE message in the same SIP session as the "Start Chase Play" command that is associated with the control channel. The SIP Re-invite message is a request to establish a unicast channel that will be used to deliver the recorded (time-shifted) content stored in the N-PVR system. As a result the content delivery changes from multicast to unicast delivery with IMS being used to effect this change.

7-8) The SIP INVITE message is transmitted over the ISC and the Multimedia Telephony (MMTEL) AS, MMTel being used as the IMS Communication Service for IPTV in this case, thus resulting in the invocation of the MMTel AS over the ISC. It should however be noted that the method will work with other IMS Communication Services and is not limited to MMTel, MMTel being given merely by way of example. The MMTel AS may invoke supplementary services, such as restriction on the number of concurrent unicast deliveries, but this is not included in the sequence.

9-10) The SIP INVITE message is sent to the STB which acknowledges the request with a 200 OK response to accept the unicast channel invitation.

10, 11) The 200 OK response is sent along the SIP session path to the IPTV-AS.

12) The IPTV AS initiates playback of the recorded content by means of a "Play" command to the N-PVR system. The IPTV-AS acts as a gateway between the Network PVR system and the STB. This enables STB/IPTV-AS specific user interaction whilst allowing use by operators of many different types of N-PVR system. The adjustment of the required N-PVR procedures and protocols is handled by the IPTV-AS. RTSP is used as an example in the sequence but the invention is not limited to RTSP.

13) Unicast delivery is started.

Incoming Call Notification

Figure 3:
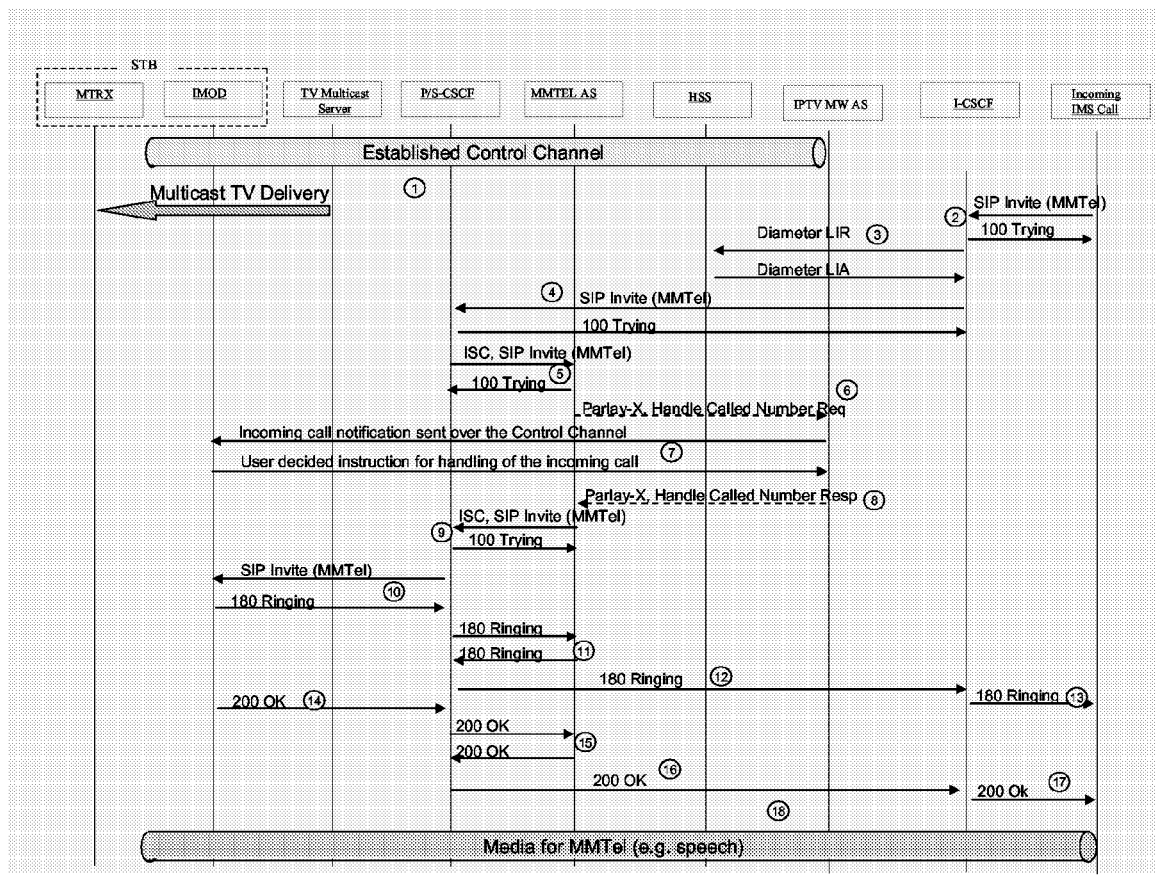
FIG. 3 is a schematic diagram illustrating a sequence for an Incoming Call Notification on screen.

This sequence describes how an Incoming Call Notification on a TV-screen and user determined call handling can be implemented for IMS calls to the STB/TV. The call is established to the STB/TV in this scenario, and the STB/TV is also used to notify a user of an incoming call and to allow the user to specify how the call shall be handled. The procedure, as schematically indicated in FIG. 3, is as follows (with reference to the numbers used in the figure):

1) A control channel is established between the STB and the IPTV-AS by the procedure described above with reference to FIG. 1. At this point the STB is receiving content that is delivered by multicast.

2) The I-CSCF in the called subscriber's network (the STB's network) receives a SIP INVITE message from the same IMS network or another IMS network, or from an IMS gateway to another network (e.g. ISDN/PSTN). The I-CSCF returns a 100 Trying response to the sender of the SIP Invite message to stop periodic retransmission of the same SIP INVITE message.

3) I-CSCF uses a Diameter LIR (Location Information Request) to obtain the called subscriber's S-CSCF address and the HSS returns this address in the LIA (Location Information Answer).

4) The SIP INVITE message is sent to the called subscriber's S-CSCF (100 trying response returned by the S-CSCF).

5) The trigger criteria for the called subscriber are stored by the S-CSCF. This IFC contains information about which AS's are to be invoked over the ISC interface. This example shows an incoming call for the MMTel IMS communication service and the MMTel AS is invoked over the ISC. The MMTel AS may invoke supplementary services, such as barring or forwarding of incoming sessions, but this is not included in the sequence.

6) The MMTel AS exposes enabling services towards other AS's to allow these to affect the session set up. The IPTV AS has subscribed to the incoming call event from the MMTel AS, and the service definition of the exposed services is based on the Parlay-X Web Service definitions for Call Control. A Parlay-X "Handle Called Number Request" is sent to the IPTV-AS. It should be noted that a Parlay-X service can also be exposed by an OSA (Open Service Access)/Parlay(-X) gateway that is connected over the ISC (IMS Service Control) interface in the same way as an IMS (IP Multimedia Subsystem) AS. It should further be noted that the IPTV-AS can be connected over the ISC in series with the MMTel AS to perform the Call Notification procedures described below. Whilst this description only refers to the alternative where the Parlay-X Call Control service is exposed by the MMTel AS, it will be appreciated that the invention is not limited to this.

7) An "Incoming Call Notification" command is sent from the IPTV-AS to the STB over the control channel. The exact procedure and syntax of the command is a matter between the STB and the IPTV-AS, and many different variants are possible. The user is given a number of call handling options, such as:

allow call to STB/TV forward call to voice-mail (multimedia mail)

forward call to another number

The user's choice is returned by the STB to the IPTV-AS. In the following it is assumed that the user chooses to allow the call.

8) The IPTV-AS returns a Parlay-X "Handle Called Number Response" to the MMTel AS with information specifying that the call set up may proceed to the STB.

9) The S-CSCF receives the SIP Invite message from the MMTel AS (MMTel works as a B2BUA in this example). An S-CSCF may perform forking for the contacts registered for one particular Public User Identity (PUI). The STB has a unique PUI in this example and no other SIP UA is allowed to register as a contact for the STB's PUI. The STB may however register as a contact for other user assigned PUIs, and this allows a mobile phone and the STB to register as possible contacts for one particular PUI for example.

10, 11, 12 13) The SIP Invite message is sent to the STB and the STB returns a 180 Ringing response which is relayed along the SIP path.

14, 15, 16, 17) A 200 OK response from the STB indicates that the session has been accepted and that the media plane can be established.

18) The media plane for speech is established and the call proceeds.

PSTN/ISDN Incoming Call Notification

Figure 4:
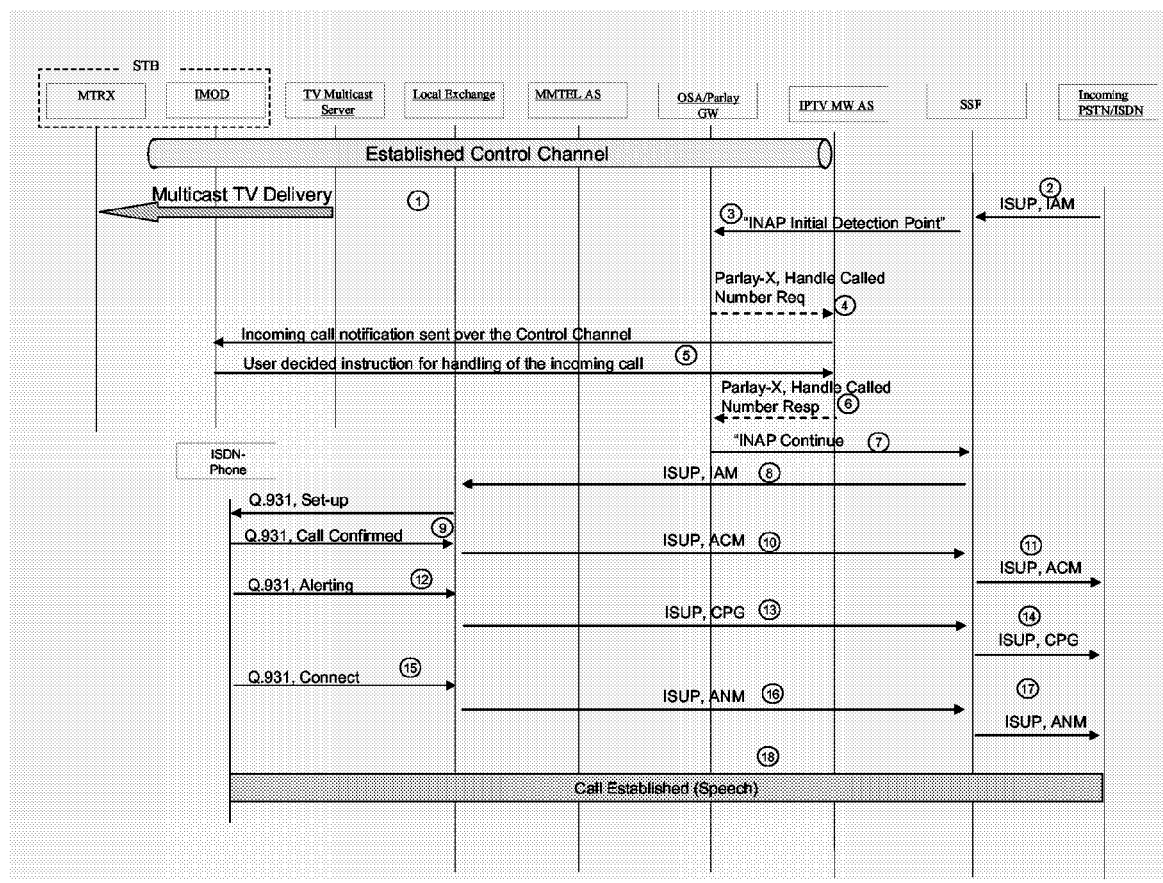
FIG. 4 is a schematic diagram illustrating a sequence for a PSTN/ISDN Incoming Call Notification.

This sequence describes how an Incoming Call Notification on a TV-screen and user determined call handling can be implemented for PSTN/ISDN phones in the home. It should be noted that the call is not established to the STB/TV in this scenario. The STB/TV is only used to notify a user of an incoming call and to allow the user to specify how the call shall be handled. The procedure, as schematically indicated in FIG. 4, is as follows (with reference to the numbers used in the figure):

1) A control channel is established between the STB and the IPTV-AS by the procedure described above with reference to FIG. 1. At this point the STB is receiving content that is delivered by multicast.

2, 3) An SSF (Service Switching Function) in the called subscriber's network receives an ISUP (ISDN User Part) IAM (Initial Address Message). This triggers the SSF to contact a Service Control Point (SCP) in an IN (Intelligent Network) architecture.

An OSA/Parlay GW (Gateway) plays the role of an SCP towards the SSF, but allows AS's to take the real decisions on how to handle calls. Many different variants on INAP protocols exist, e.g. CS1, CS2, CAP, etc. This description is given with reference to an IDP (Initial Detection Point) operation invocation which can be found in CAP (CAMEL Application Part), although it will be appreciated that the invention is not limited to this particular type of INAP (Intelligent Network Application Part).

4) The IDP is translated into the Parlay-X Web service definition for Call Control. A Parlay-X "Handle Called Number Request" is sent to the IPTV-AS. This is the same message that was sent in the previous sequence from the MMTel IMS AS to the IPTV AS, and enables the IPTV AS to have a common call handling interface for IMS and PSTN/ISDN calls. It should be noted that the IPTV-AS can also be connected as an SCP (Service Control Point) via INAP. This description refers only to the alternative where the Parlay-X Call Control service is used, but the invention is not limited to this.

5) An "Incoming Call Notification" command is sent from the IPTV-AS to the STB over the control channel. The exact procedure and syntax of the command is a matter between the STB and the IPTV-AS, and many different variants are possible. The user is given a number of call handling options, such as:

allow call to STB/TV
  forward call to voice-mail (multimedia mail)
  forward call to another number The user's choice is returned by the STB to the IPTV-AS. In the following it is assumed that the user chooses to allow the call.

6) The IPTV-AS returns a Parlay-X "Handle Called Number Response" to the MMTel AS with information specifying that the call set up to the PSTN/ISDN phone may proceed.

7) The OSA/Parlay GW returns the appropriate INAP message to the SSF, e.g. a Continue operation invocation.

8) The SSF sends an ISUP IAM message to the Local Exchange that the user's PSTN/ISDN phone is connected to.

9) A Q.931 ISDN Set-up message is sent to the ISDN phone (only ISDN shown from now on), and is acknowledged by a Call Confirmed message.

10, 11) An ISUP ACM (Address Complete Message) message is sent from the Local Exchange to the SSF (Service Switching Function) and onwards.

12, 13, 14) An alert is forwarded in ISUP CPG (Call Progress).

15, 16, 17) An Answer message is translated into an ISUP ANM (Answer Message).

18) The ISDN/PSTN call is established.

Extended Incoming Call Scenario with Time-shift

Figure 5:
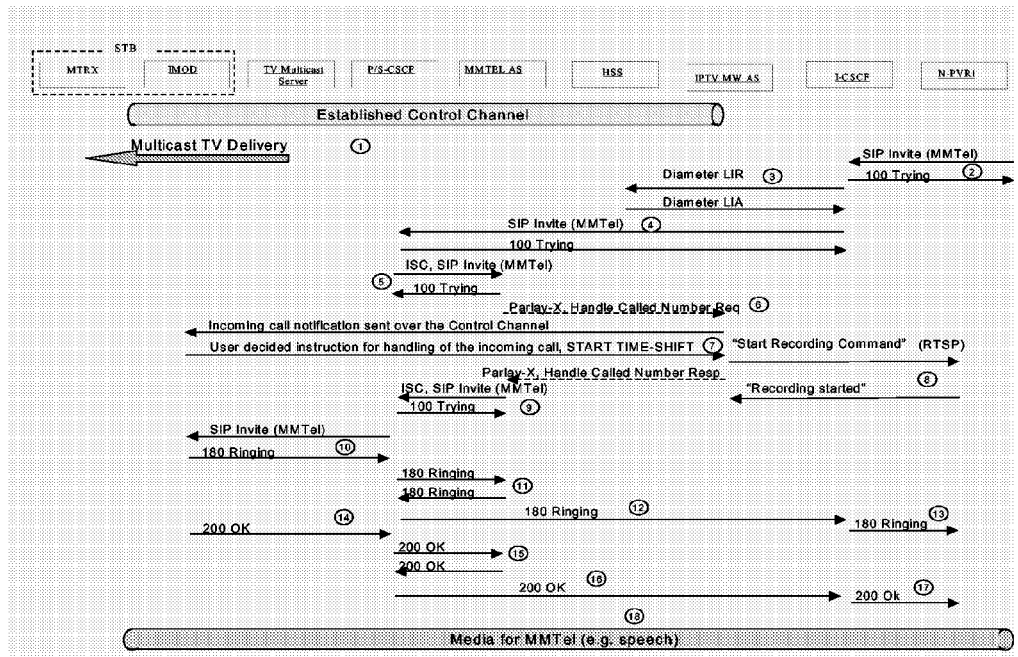
FIG. 5 is a schematic diagram illustrating a sequence for an Extended Incoming Call Notification scenario with Time-shift.
Figure 5:
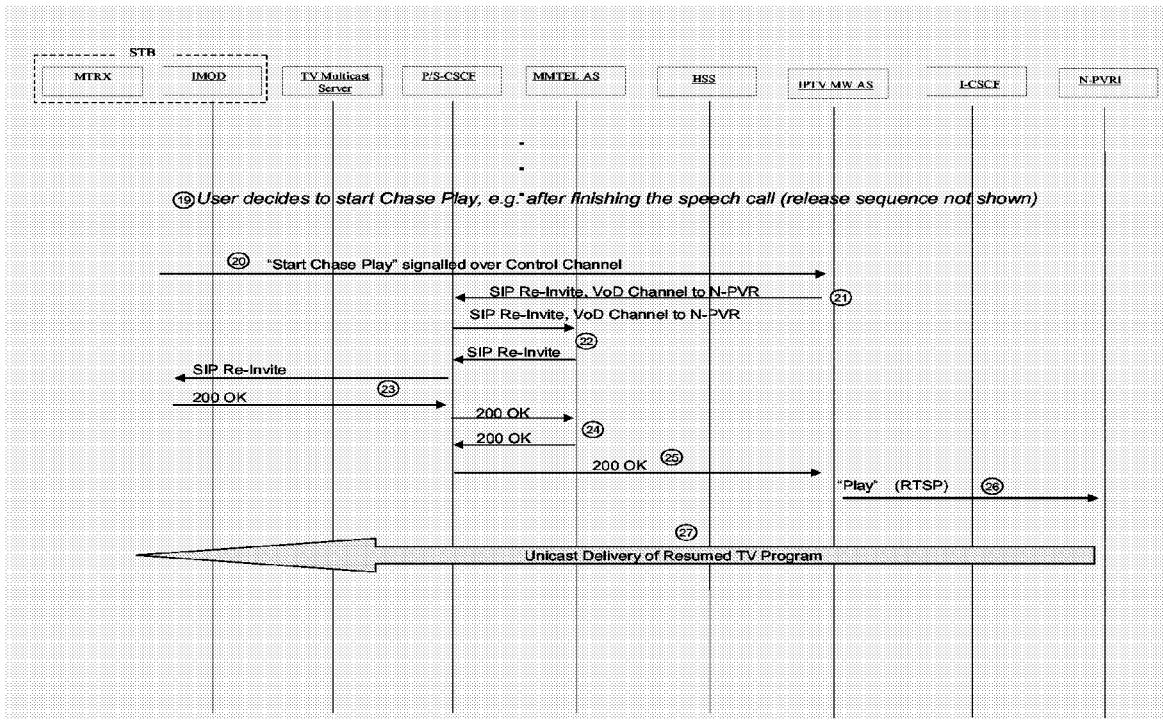
Figure 6:
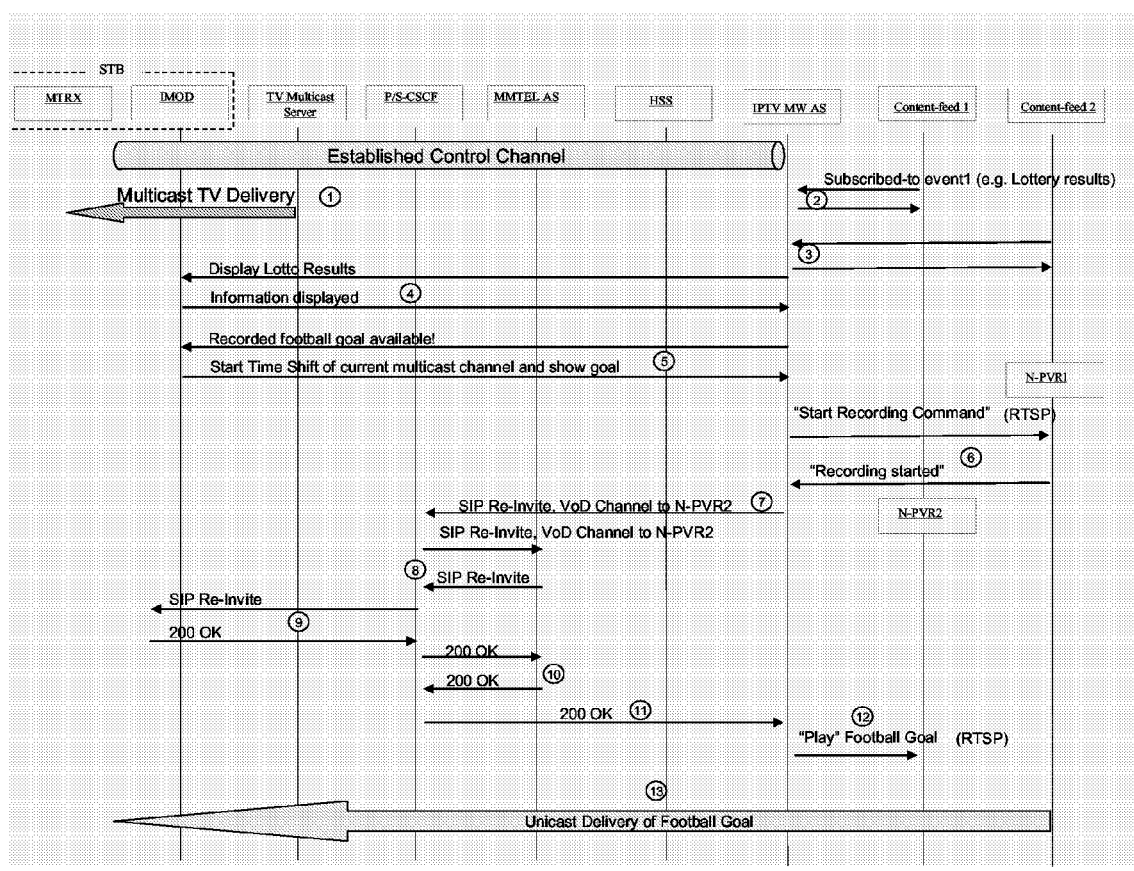
FIG. 6 is a schematic diagram illustrating a sequence for an Event Triggered Time-shift.

This sequence extends the Incoming Call Notification sequence with Time-Shift functionality. The procedure, as schematically indicated in FIG. 5, is as follows (with reference to the numbers used in the figure):

1) A control channel is established between the STB and the IPTV-AS by the procedure described above with reference to FIG. 1. At this point the STB is receiving content that is delivered by multicast.

2) The I-CSCF in the called subscriber's network (the STB's network) receives a SIP Invite message from the same IMS network or another IMS network, or from an IMS gateway to another network (e.g. ISDN/PSTN). The I-CSCF returns a 100 Trying response to the sender of the SIP Invite message to stop periodic retransmission of the same SIP Invite message.

3) I-CSCF uses a Diameter LIR (Location Information Request) to obtain the called subscriber's S-CSCF address and the HSS returns this address in the LIA (Location Information Answer).

4) The SIP INVITE message is sent to the called subscriber's S-CSCF (100 trying response returned by the S-CSCF).

5) The trigger criteria for the called subscriber are stored by the S-CSCF. This IFC contains information about which AS's that are to be invoked over the ISC interface. This example shows an incoming call for the MMTel IMS communication service and the MMTel AS is invoked over the ISC. The MMTel AS may invoke supplementary services such as barring or forwarding of incoming sessions, but this is not included in the sequence.

6) The MMTel AS exposes enabling services towards other AS's to allow these to affect the session set up. The IPTV AS has subscribed to the incoming call event from the MMTel AS, and the service definition of the exposed services is based on the Parlay-X Web Service definitions for Call Control. A Parlay-X "Handle Called Number Request" is sent to the IPTV-AS. It should be noted that a Parlay-X service can also be exposed by an OSA/Parlay(-X) gateway (OSA=Open Service Access) that is connected over the ISC (IMS Service Control) interface in the same way as an IMS-AS. It should further be noted that the IPTV-AS can be connected over the ISC in series with the MMTel AS to perform the Call Notification procedures described below. Whilst this description only refers to the alternative where the Parlay-X Call Control service is exposed by the MMTel AS, it will be appreciated that the invention is not limited to this.

7) An "Incoming Call Notification" command is sent from the IPTV-AS to the STB over the control channel. The exact procedure and syntax of the command is a matter between the STB and the IPTV, and many different variants are possible. The user is given a number of call handling options, such as:

allow call to STB/TV
  forward call to voice-mail (multimedia mail)
  forward call to another number
  allow call and start Time-Shift The user's choice is returned by the STB to the IPTV-AS. In this example the user chooses to allow the call and to start Time-Shift.

8) The IPTV-AS initiates recording of the currently viewed multicast channel. This is possible since the STB always reports which multicast channel it is currently receiving after a channel change (not shown in the sequences). A "Start Recording" command is sent from the IPTV-AS to the N-PVR system. The IPTV-AS acts as a gateway between the Network PVR system and the STB. This enables STB/IPTV- AS specific user interaction whilst allowing use by operators of many different types of N-PVR system. The adjustment of the required N-PVR procedures and protocols is handled by the IPTV-AS.

9) The IPTV-AS returns a Parlay-X "Handle Called Number Response" to the MMTel AS with information specifying that the call set up may proceed to the STB. The S-CSCF receives the SIP INVITE message from the MMTel AS (MMTel works as a B2BUA in this example). An S-CSCF may perform forking for the contacts registered for one particular Public User Identity. The STB has a unique PUI in this example and no other SIP UA is allowed to register as a contact for the STB's PUI. The STB may however register as a contact for other user assigned PUIs, and this allows a mobile phone and the STB to register as possible contacts for one particular PUI for example.

10, 11, 12 13) The SIP INVITE message is sent to the STB and the STB returns a 180 Ringing response which is relayed along the SIP path.

14, 15, 16, 17) A 200 OK response from the STB indicates that the session has been accepted and that the media plane can be established.

18) The media plane for speech is established and the call proceeds.

19) When the user is ready to resume viewing of the time-shifted content, he initiates the Chase Play function.

20) A "Start Chase Play" command is sent from the STB to the IPTV-AS over the control channel. The exact procedure and syntax of the command is a matter between the STB and the IPTV-AS, and many different variants are possible. The IPTV-AS acts as a gateway between the Network PVR system and the STB. This enables STB/IPTV-AS specific user interaction whilst allowing use by operators of many different types of N-PVR system. The adjustment of the required N-PVR procedures and protocols is handled by the IPTV-AS. RTSP is used as an example in the sequence but the invention is not limited to RTSP.

21) The IPTV-AS sends a SIP INVITE message on the same SIP session that is associated with the control channel. The SIP INVITE message is a request to establish a unicast channel that will be used to deliver the recorded (time-shifted) content stored in the N-PVR system. As a result the content delivery changes from multicast to unicast with the IMS being used to effect this change.

22, 23) The SIP INVITE message is transmitted over the ISC and the MMTEL AS.

24, 25) The SIP INVITE message is sent to the STB which acknowledges the request with a 200 OK response to accept the unicast channel invitation.

26) The IPTV AS initiates playback of the recorded content by means of a "Play" command to the N-PVR system. The IPTV-AS acts as a gateway between the Network PVR system and the STB. This enables STB/IPTV-AS specific user interaction whilst allowing use by operators of many different types of N-PVR system. The adjustment of the required N-PVR procedures and protocols is handled by the IPTV-AS. RTSP is used as an example in the sequence but the invention is not limited to RTSP.

27) Unicast delivery is started.

Event Triggered Time-Shift

This sequence is an example of how operators can use the control channel to deliver personalized information services combined with the Time-Shift function described previously. This solution makes it possible to combine IPTV Service, IMS Communication Services and Personalized Information Services and enables the network to take an active role in IPTV delivery and operators to offer personalized Triple-Play service offerings. The procedure, as schematically indicated in FIG. 7, is as follows (with reference to the numbers used in the figure):

1) A control channel is established between the STB and the IPTV-AS by the procedure described above with reference to FIG. 1. At this point the STB is receiving content that is delivered by multicast.

2, 3) Two user subscribed-to information events are delivered to the IPTV-AS. The procedure for subscribing to the events is not shown in the sequence but can be implemented over the control channel.

4) The first event reporting lottery results is delivered to the STB over the control channel, and the results are displayed by the STB. The user may start the Time-Shift function if so desired, but this is not shown.

5) A notification is sent over the control channel specifying that a recorded football goal is available. The subscribed-to event may for example be goals occurring in a particular football game. When presented with this information, the user can choose to watch the goal and start the Time Shift for the channel that he is currently watching.

6) As a result the IPTV-AS initiates recording of the currently viewed multicast channel. This is possible as the STB always reports which multicast channel it is currently receiving after a channel change has occurred (not shown in the figure).

7) The IPTV-AS sends a SIP INVITE message in the same SIP session as that of the notification sent over the control channel. The SIP INVITE message is a request to establish a unicast channel that will be used to deliver the football goal stored in the N-PVR2 system.

8, 9) The SIP INVITE message is transmitted over the ISC and the MMTEL AS. MMTel is used as the IMS Communication Service for IPTV in this method, thus resulting in the invocation of the MMTel AS over the ISC.

10, 11) The SIP INVITE message is sent to the STB which acknowledges the request with a 200 OK response to accept the unicast channel invitation.

12) The IPTV AS initiates playback of the recorded goal by means of a "Play" command to the N-PVR system. The IPTV-AS acts as a gateway between a N-PVR system and the STB.

13) Unicast delivery of the goal is started.

14) When the user is ready to resume viewing of the time-shifted content, he initiates the Chase Play function.

15) A "Start Chase Play" command is sent from the STB to the IPTV-AS over the control channel. The exact procedure and syntax of the command is a matter between the STB and the IPTV-AS, and many different variants are possible.

16) The IPTV-AS sends a SIP INVITE message in the same SIP session as that of the "Start Chase Play" command sent over the control channel. The SIP INVITE message is a request to establish a unicast channel that will be used to deliver the recorded (time-shifted) content stored in the N-PVR1 system.

17) The SIP INVITE message is transmitted over the ISC and the MMTEL AS.

18, 19 20) The SIP INVITE message is sent to the STB which acknowledges the request with a 200 OK response to accept the unicast channel invitation.

21) The IPTV AS initiates playback of the recorded content by means of a "Play" command to the N-PVR1 system.

22) Unicast delivery of the originally viewed program is started

The above described IMS based method for switching between multicast and unicast delivery of content relies on the IPTV-AS acting as a gateway between the Network PVR system and the STB's so that the network takes an active role in IPTV delivery and permits operators to offer a personalized Triple-Play service. By limiting the amount of content transmitted over the first mile of a broadband connection this frees up available bandwidth for use by other services.

It will be appreciated by the persons skilled in the art that various modifications may be made to the embodiment described above without departing from the scope of the present invention.

The invention claimed is:

1. A method of time-shifting and chase-play for an IPTV system comprising an IP Multimedia Subsystem (IMS) including an IPTV Application Server, and a Network Private Video Recorder coupled to the IPTV Application Server, the method comprising:
    using Session Initiation Protocol (SIP) signaling over the IMS to establish a control channel between an originating user and said IPTV Application Server;
    continuing delivery of content to the user by multicast;
    sending an incoming IMS call notification from the IPTV Application Server to the originating user over said control channel;
    sending a user decision instruction for handling the incoming IMS call, wherein the user decision instruction is sent from the originating user to the IPTV Application Server over said control channel in response to receiving the incoming IMS call notification;
    sending a start time-shift command to the IPTV Application Server over the control channel;
    sending a start recording command from the IPTV Application Server to said Network Private Video Recorder to initiate recording of current multicast content;
    establishing a media plane for speech or multimedia communication in response to the user decision instruction, wherein the media plane is established using SIP signaling over the IMS;
    when the user is ready to resume viewing of the time-shifted content, sending a start chase-play command from the user to the IPTV Application Server over the control channel;
    using SIP signaling over the IMS to establish a unicast channel between the user and the Network Private Video Recorder for playback of the time-shifted content;
    switching the mode of content delivery to the user from multicast to unicast; and
    sending a playback command from the IPTV Application Server to the Network Private Video Recorder system to initiate playback of the time-shifted content over the unicast channel.

2. The method according to claim 1, further comprising returning an indication that recording has been started from the IPTV Application Server to the originating user over said control channel.

3. The method according to claim 1, wherein a SIP INVITE message is sent from the IPTV Application Server to the user to establish the unicast channel for playback of the time-shifted content.

4. The method according to claim 1, further comprising establishing a separate ISDN/PSTN channel for speech in response to the user decision instruction.

5. The method according to claim 1, wherein said start time-shift command corresponds to said user decision instruction, and the start recording command from the IPTV Application Server to the Network Private Video Recorder is triggered in response to the user decision instruction.

6. The method according to claim 1, further comprising sending an indication that a subscribed-to event is available for viewing from the IPTV Application Server to the originating user over said control channel, wherein the user is given the option of sending a start time-shift command to the IPTV Application Server to initiate recording of current multicast content while viewing the subscribed-to event.

7. A time-shifting and chase-play IPTV system comprising:
    an IP Multimedia Subsystem (IMS) including an IPTV Application Server and a Network Private Video Recorder coupled to the IPTV Application Server;
    channel control means for establishing a control channel between an originating user and said IPTV Application Server using Session Initiation Protocol (SIP) signaling over the IMS;
    multicast delivery means to continue delivering content to the originating user by multicast;
    means for sending an incoming IMS call notification from the IPTV Application Server to the originating user over said control channel;
    means for sending a user decision instruction for handling the incoming IMS call, wherein the user decision instruction is sent from the originating user to the IPTV Application Server over said control channel in response to receiving the incoming IMS call notification;
    start time-shift means for sending a start time-shift command to the IPTV Application Server over the control channel;
    start recording means for sending a start recording command from the IPTV Application Server to said Network Private Video Recorder to initiate recording of current multicast content;
    means for establishing a media plane for speech or multimedia communication in response to the user decision instruction, wherein the media plane is established using SIP signaling over the IMS;
    start chase-play means for sending a start chase-play command from the user to the IPTV Application Server over the control channel when the user is ready to resume viewing of the time-shifted content, and for using SIP signaling over the IMS to establish a unicast channel between the user and the Network Private Video Recorder for playback of the time-shifted content;
    means for switching the mode of content delivery to the user from multicast to unicast; and
    playback means for sending a playback command from the IPTV Application Server to the Network Private Video Recorder to initiate playback of the time-shifted content over the unicast channel.

8. A method in an IPTV Application Server in an IP Multimedia Subsystem (IMS) for controlling time-shifting and chase-play for an IPTV system, wherein Session Initiation Protocol (SIP) signaling is utilized over the IMS to establish a control channel between the IPTV Application Server and an originating user, said method comprising:
    continuing delivery of content to the user by multicast;
    sending an incoming IMS call notification to the user over said control channel;
    receiving a user decision instruction for handling the incoming IMS call, wherein the user decision instruction is sent from the originating user to the IPTV Application Server over said control channel in response to receiving the incoming IMS call notification;
    receiving a start time-shift command from the user over the control channel;
    in response to receiving the start time-shift command, sending a start recording command to a Network Private Video Recorder to initiate recording of current multicast content;

facilitating establishment of a media plane for speech or multimedia communication in response to the user decision instruction, wherein the media plane is established using SIP signaling over the IMS;

receiving a start chase-play command from the user over the control channel, said start chase-play command indicating that the user is ready to resume viewing of the time-shifted content;

utilizing SIP signaling over the IMS to establish a unicast channel between the user and the Network Private Video Recorder for playback of the time-shifted content;

switching the mode of content delivery to the user from multicast to unicast; and sending a playback command to the Network Private Video Recorder system to initiate playback of the time-shifted content over the unicast channel.

9. A computer program loaded on a non-transitory computer readable medium of an IPTV Application Server for controlling time-shifting and chase-play for an IPTV system, said computer program comprising software code portions for performing the following steps when the computer program is run on a processor of the IPTV Application Server:

utilizing Session Initiation Protocol (SIP) signaling over an IP Multimedia Subsystem (IMS) to establish a control channel with an originating user;

continuing delivery of content to the user by multicast;

sending an incoming IMS call notification to the user over said control channel;

receiving a user decision instruction for handling the incoming IMS call, wherein the user decision instruction is sent from the originating user to the IPTV Application Server over said control channel in response to receiving the incoming IMS call notification;

receiving a start time-shift command from the user over the control channel;

in response to receiving the start time-shift command, sending a start recording command to a Network Private Video Recorder to initiate recording of current multicast content;

facilitating establishment of a media plane for speech or multimedia communication in response to the user decision instruction, wherein the media plane is established using SIP signaling over the IMS;

receiving a start chase-play command from the user over the control channel, said start chase-play command indicating that the user is ready to resume viewing of the time-shifted content;

utilizing SIP signaling over the IMS to establish a unicast channel between the user and the Network Private Video Recorder for playback of the time-shifted content;

switching the mode of content delivery to the user from multicast to unicast; and sending a playback command to the Network Private Video Recorder system to initiate playback of the time-shifted content over the unicast channel.

* * * * *